United States Patent [19]

Gucker

[11] 3,824,623

[45] July 16, 1974

[54] SYSTEM FOR REDUCING CROSS TALK OF UNSELECTED MAGNETIC HEADS INTO A SELECTED HEAD

[75] Inventor: George C. Gucker, Old Bethpage, N.Y.

[73] Assignee: Potter Instrument Company, Inc., Plainview, N.Y.

[22] Filed: Dec. 14, 1972

[21] Appl. No.: 314,929

[52] U.S. Cl. .................................................. 360/124

[51] Int. Cl. .................................................. G11b 5/44

[58] Field of Search 340/174.1 D, 174.1 G, 174.1 H, 340/174.1 B

[56] References Cited

UNITED STATES PATENTS

| | | | |
|---|---|---|---|
| 2,926,298 | 2/1960 | Newhouse | 340/174.1 D |
| 2,941,190 | 6/1960 | Lindley | 340/174.1 D |
| 3,019,420 | 1/1962 | Reinholtz | 340/174.1 D |
| 3,092,817 | 6/1963 | Diemant | 340/174.1 D |
| 3,119,095 | 1/1964 | Hansen | 340/174.1 D |

*Primary Examiner*—Vincent P. Canney
*Attorney, Agent, or Firm*—Lane, Aitken, Dunner & Ziems

[57] ABSTRACT

A plurality of individually selectable magnetic read/-write heads are coupled in parallel to signal transmitting circuitry, such as a read amplifier. The magnetically responsive coil in each head is equipped with a low impedance shunt circuit including a pair of opposed, series-connected diodes having their common junction tied to a reference voltage. Additional head-isolating diodes connect the ends of each head coil to the signal transmitting circuitry. A head is selected by applying a predetermined voltage to a given head coil to forward-bias the associated head-isolating diodes. The head-isolating diodes for the unselected heads, however, remain reverse-biased by virtue of a reference voltage applied to each of the unselected head coils. By virtue of the relationship between the reference voltage applied to the coil and the reference voltage applied to the shunt diode junction, the diodes in each shunt circuit for an unselected head are forward-biased. Accordingly, input signals picked up by an unselected head are effectively shunted out and not permitted to superimpose additive noise on the read or write signal associated with the selected head, whose shunt circuit is rendered inoperative.

11 Claims, 4 Drawing Figures

SYSTEM FOR REDUCING CROSS TALK OF UNSELECTED MAGNETIC HEADS INTO A SELECTED HEAD

BACKGROUND OF THE INVENTION

The invention relates generally to the field of magnetic head circuits, and especially to data storage systems in which a single disc or other medium is "driven" by a plurality of heads which are written into or read by common signal transmitting circuits, thus presenting the problem of cross talk.

In the past, the type of noise known as cross talk has been a major problem in magnetic disc systems employing plural disc drive heads for reading data out of the disc and for writing data onto the disc in prescribed annular tracks. Although the heads are selected for reading or writing one-at-a-time, the unselected heads nevertheless continue to pick up magnetic signals from their associated tracks. If all of the heads play into a single read preamplifier, for example, a selected head must be well isolated from the unselected heads to prevent the signals on the unselected heads from interfering with the output from a selected head. Prior systems for accomplishing the necessary isolation have been only partially successful in reducing cross talk. Since the coupled noise from all of the unselected heads is additive, the problem can be severe under the proper circumstances. Consequently, prior systems have resorted to grouping the heads in an isolating manner to reduce the number of unselected heads contributing to the cross talk problem in a given selected head. The prior system, described below in detailed reference to the drawings, necessitated a complicated head selection system and redundant write circuits and current sources, as well as precisely matched components.

SUMMARY OF THE INVENTION

The general purpose of the invention is thus to reduce cross talk from unselected magnetic heads. A further object of the invention is to simplify the head selection requirements by reducing cross talk. A further object of the invention is to enable the use of a common read and write circuitry for a large number of heads without resorting to separate groupings of heads with separate write circuits and current sources.

The applicant has discovered a simple, yet uniquely effective means of virtually eliminating cross talk from unselected heads in systems where a plurality of heads share common signal transmitting circuits, such as a read preamplifier. Briefly, a plurality of heads are served by a common write circuit and a common current source. The heads play into the same read preamplifier. Each head contains a head coil which is electrically responsive to the magnetic condition of the associated track on the magnetic medium against which the heads are disposed. The ends of each head coil are connected in parallel via respective isolating diodes to the read preamplifier and write circuit. A head selection circuit associated with each head coil applies a predetermined unselect voltage to each unselected head coil and a different predetermined select voltage to the one selected head coil. The selected voltage causes the isolation diodes to become forward-biased, permitting conduction of the signal from the selected head to the preamplifier or alternatively permitting the write signal to be applied to the selected head. On the other hand, the unselect voltage causes all of the unselected heads to be isolated by virtue of the normally reverse-biased isolating diodes. To eliminate cross talk a low impedance switchable shunt circuit is connected across each head coil. In the preferred embodiment, each shunt circuit includes a pair of series-connected, opposed diodes having their common junction connected to a reference voltage such that the shunt diodes for all unselected heads are forward-biased or conducting by virtue of the unselect voltage from the selection circuit, and the shunt diodes for the one selected head are reverse-biased or nonconducting during application of the select voltage. Thus, by virtue of the shunt circuits, the outputs of all of the unselected heads are effectively minimized without attenuating the selected head signal so that very little unselected head noise is coupled to the selected head or its output.

DESCRIPTION OF THE PREFERRED EMBODIMENT

Figure 1:
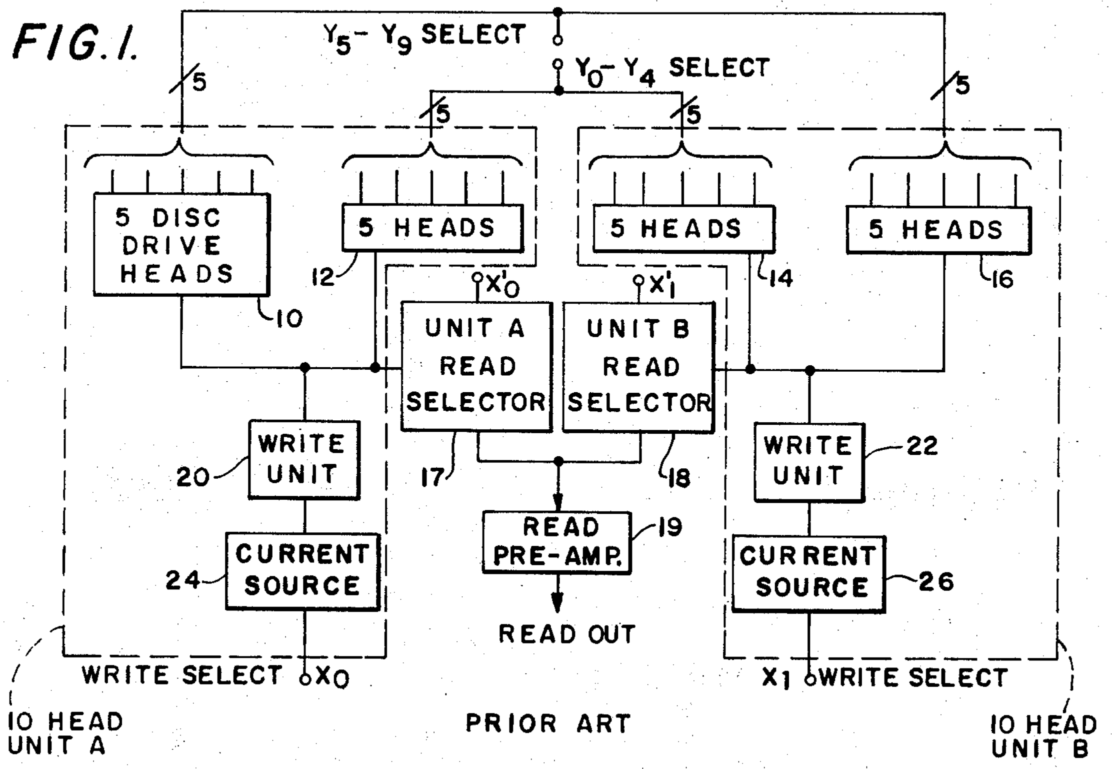
FIG. 1 is a block diagram of a 20 head read/write system resorted to in the past to reduce cross talk from unselected heads to a selected head.
Figure 2:
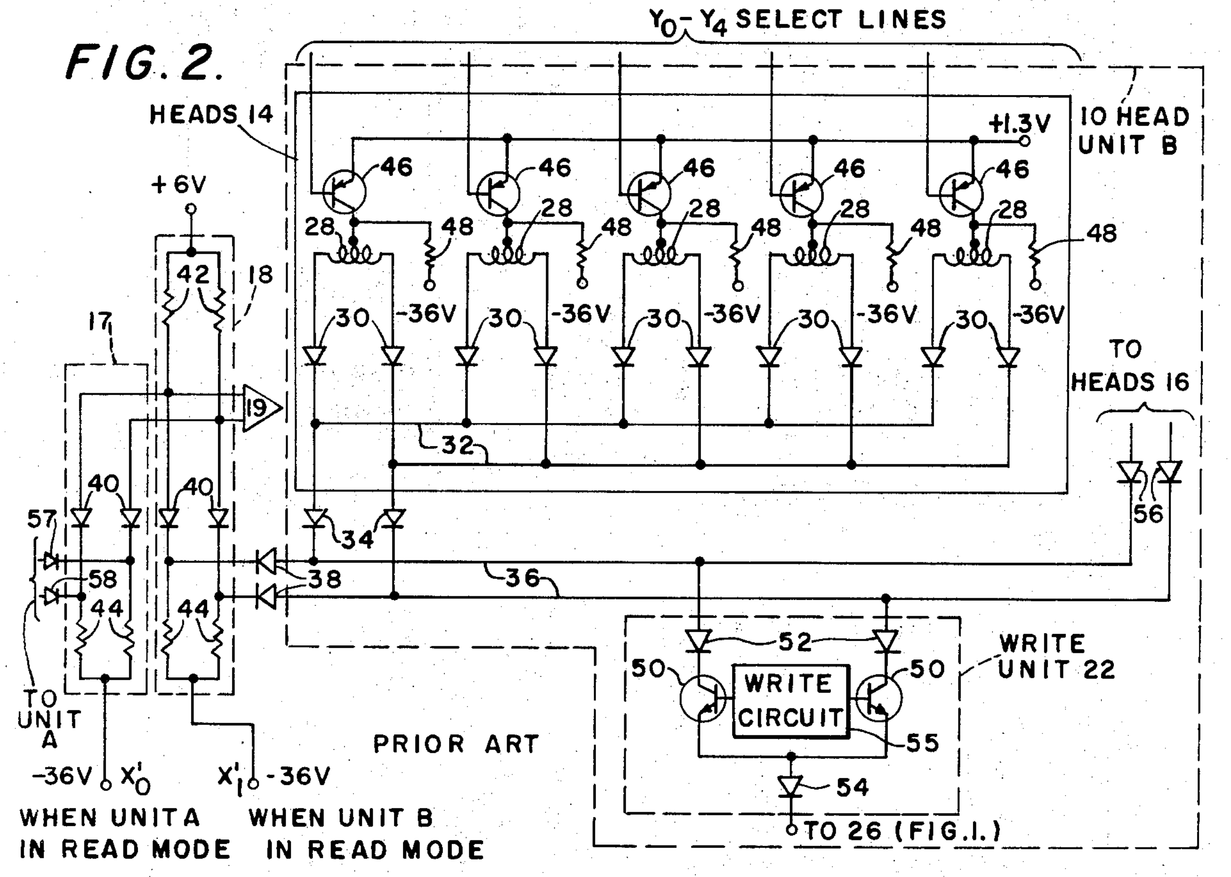
FIG. 2 is a schematic diagram illustrating one of the prior art 10 head units of FIG. 1 in more detail.

The prior art plural head circuit illustrated in FIGS. 1 and 2 employs 20 magnetic disc drive heads which individually read and write data in magnetic form on corresponding tracks of a conventional magnetic disc (not shown). The heads are divided electrically into two 10 head units A and B, each having two groups of 5 heads indicated by reference numerals 10 and 12, and 14 and 16. The 10 heads of each unit are connected in parallel via respective read selectors 17 and 18 to a common read preamplifier 19. Separate write units 20 and 22 and current sources 24 and 26 are connected to operate the 10 heads in each of the units A and B respectively. In order to select one head among the 20 heads, a so-called "matrix" selection system is used, in which 10 common selection lines $Y_0 - Y_9$ serve 20 corresponding heads in the two head units A and B. The final selection of one of the two heads indicated by activating a single Y-select line is made in the write mode by activating one of the current sources 24 and 26 via the respective select lines $X_0$ and $X_1$. In the read mode one of the read selector lines $X'_0$ or $X'_1$ is activated. Accordingly, each head is identified by the "coordinates" $X_m$, $Y_n$, in the write mode and $X'_n$, $Y_n$ in the read mode, where $m = 0$ or 1, and $n = 0$–9.

The system of FIG. 1, in which four groups of heads are used with a pair of separate write units 20 and 22, current sources 24 and 26 and read selectors 17 and 18, resulted from the necessity of isolating the heads from each other to the extent practically possible, because cross talk from unselected heads, while reduced by the prior art implementation in FIG. 2, was still a major problem.

FIG. 2 shows specific prior art head circuitry for a portion of the 10-head unit B of FIG. 1. A first group of 5 heads, corresponding to heads 14 in FIG. 1, includes five coils 28 individually responsive to the magnetic condition along associated tracks of a magnetic disc. Generally, in the read mode varying current is induced in a coil 28 by the storage medium and applied to the read preamplifier 19. In the write mode a data input current in the coil 28 causes corresponding local magnetic alignment of the magnetic material in the associated disc track. The ends of each coil 28 are connected via respective matched diodes 30 arranged for conduction away from the coil to a pair of respective bus lines 32 which in turn are connected via respective matched diodes 34, arranged for conduction in the same direction as the diodes 30, to another pair of bus lines 36. The bus lines 36 lead to the unit B read selector 18 via similarly oriented matched diodes 38. The selector 18 has a pair of voltage dividers, each comprising a diode 40 in series between a pair of resistors 42 and 44. At one end of each voltage divider in selector 18, the resistors 42 are connected in common to a positive 6 volt source. At the other end of each voltage divider the resistors 44 are connected in common to the $X'_1$ terminal. Negative 36 volts is applied to the $X'_1$ lead when one of the 10 heads in unit B is selected for read out. The bus lines 36 for unit B are connected, after the diodes 38, between the resistor 44 and diode 40 in each voltage divider of selector 18. The input lines to the read preamplifier 19 are connected respectively to the junctions between the diodes 40 and resistors 42. The details and operation of the read selectors 17 and 18 for units A and B are identical, except that selector 17 shares the resistors 42 and +6 volt source, shown in FIG. 2 as part of selector 18.

The head select and unselect circuitry for the coils 28 of heads 14 in FIG. 2 comprise five respective PNP transistors 46. The emitters of the transistors 46 are connected in common to a positive 1.3 volt reference source. The collector of each transistor 46 is connected to the midpoint or center tap of the corresponding head coil 28. The collectors of the transistors 46 are also connected via respective resistors 48 (typically 10 Kilohms) to a common negative 36 volt source. The bases of the transistors 46 shown in FIG. 2 serve as the $Y$-select lines $Y_0 - Y_4$.

The bus lines 36 for unit B are also connected to the write unit 22, which includes a pair of NPN transistors 50 with their collectors connected via diodes 52 to the bus lines 36 respectively. The emitter of each transistor 50 is connected in common to the current source 26 via a diode 54 when the write mode is selected for one of the unit B heads. At all other times the current source 26 is deactivated. The bases of the transistors 50 are connected to a write circuit 55, which operates the transistors 50 in a complementary, differential fashion described below, to generate a data input signal.

The bus lines 36 are also connected to the second group of 5 heads (heads 16, FIG. 1) via respective diodes 56 which correspond to diodes 34. The heads 16 are not shown in detail in FIG. 2 since their circuitry duplicates that for the heads 14.

In operation, the transistors 46 are normally cut-off or nonconducting, that is the base leads are positive with respect to the emitter, and therefore minus 36 volts is applied to the unselected coils 28 via the resistors 48. To select one of the heads for either write in or read out, the corresponding $Y$-line is caused to go negative with respect to the emitter, switching the corresponding transistor 46 to the conductive state in which approximately +1.3 volts is applied to the center tap of the selected coil 28.

Assume now that the read mode is chosen by applying negative 36 volts to the $X'_1$ lead of the read selector 18 for unit B. The voltage applied to the cathodes of the diodes 38, somewhat more positive than negative 36 volts, coacts with the +1.3 volts applied to the anodes of the diodes 30 for the selected head coil 28 such that the two diodes 30 as well as diodes 34 and 38 are all forward-biased into conduction. The remaining pairs of diodes 30 are reverse-biased because their anodes are still at approximately negative 36 volts. Thus, the unselected head coils are isolated from the read preamplifier 19, while the selected head coil is read out into the preamplifier.

In the write mode, the current source 26 is activated via the $X_1$ write select lead (FIG. 1). The effective voltage at the cathode of the diode 54 is such that the head diodes 30 of the selected coil 28 are forward-biased along with diodes 34, 52 and 54 by virtue of the +1.3 volts at the center tap of the selected coil. Thus the voltage at the cathode of the diode 54 must remain at a voltage more negative than +1.3 volts when the write unit 22 is selected. The diodes 30 associated with the unselected coils 28 are reverse-biased, as in the read mode. The write circuit 55 controls the conduction of the transistors 50 in accordance with the data signal.

It should be noted that current flows away from the center tap of the selected coil in opposite directions in the write mode. Thus, if these two currents are the same because the collector currents of both transistors 50 are the same, the resulting balanced magnetic fields cancel each other, and no write-in occurs. Data is written into the magnetic medium by unbalancing the currents flowing from the center tap of the coil through the two transistors 50 respectively. This is accomplished by raising the base voltage for one transistor 50 while lowering it for the other. In this way the write circuit produces unbalanced opposite currents in the selected coil resulting in net magnetic fields. The complementary conditions of the transistors 50 are switched back and forth at predetermined times to record data.

Because the diodes 30 in the unselected heads are not perfect open switches in the reverse-biased condition, but capacitively couple some of the signal picked up from the storage medium by the unselected coils, the additive noise from the four unselected heads is coupled into the selected head signal. This adverse effect takes place in both read and write modes but this noise current is negligible compared to the write current amplitude. It should be noted that the noise coupling from head group 16 is not only decoupled by its equivalent diodes 30 but also by diodes 56 while head groups 10 and 12 are similarly decoupled with diodes 57 (equivalent to 38) and 58 (equivalent to 56). Because the read noise can be additive from the unselected heads, coupling all 20 head coils via diodes 30 to a single set of bus lines would result in an unacceptable amount of cross talk. However, the above utilization of 4 groupings of 5 heads approximately result in only 4 heads coupling objectional noise.

Figure 3:
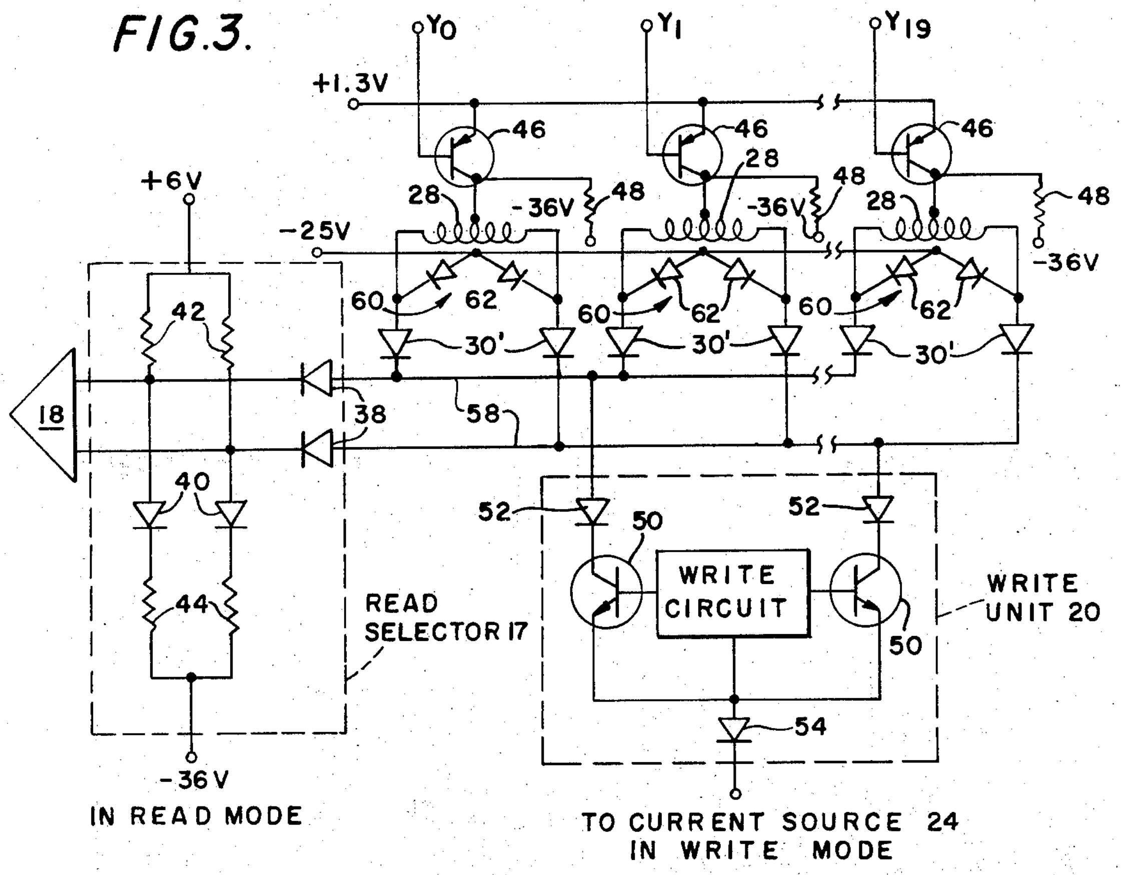
FIGS. 3 and 4 are respectively a schematic and block diagram illustrating a 20 head unit according to the invention.
Figure 4:
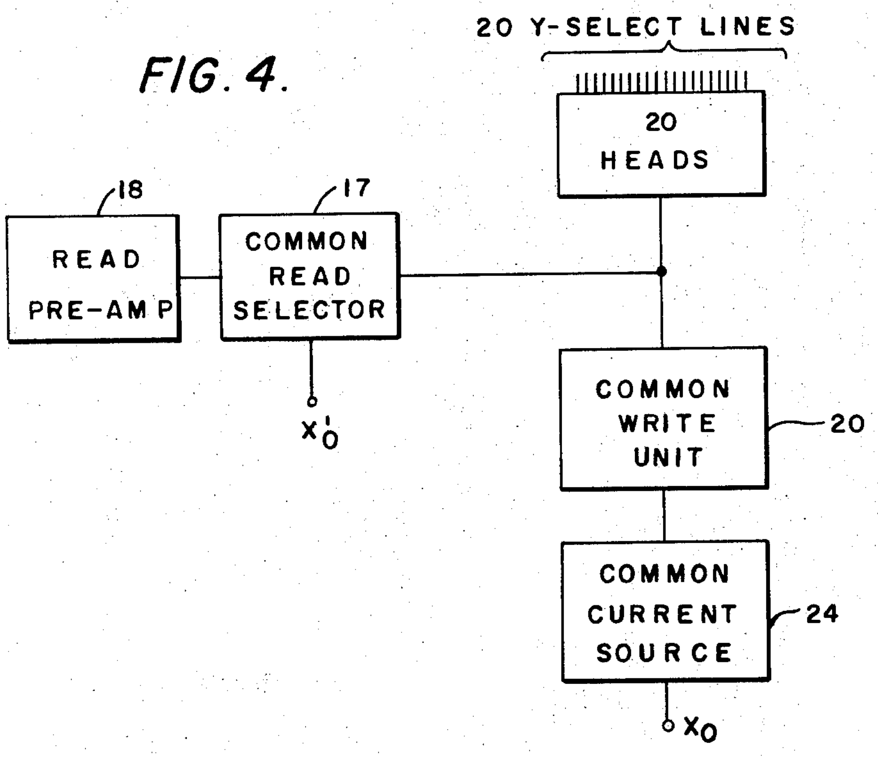

The cross talk problem is virtually eliminated in the improved system illustrated in FIGS. 3 and 4. Each head coil 28 is connected via a diode network to a single pair of bus lines 58. The diode network for each coil 28 comprises isolating diodes 30' connecting respective ends of each coil 28 to the corresponding bus lines 58, similar, thus far, to the arrangement shown in FIG. 2. In addition, however, a low impedance, switchable diode shunt circuit 60 is connected across each coil 28. The shunt circuit 60 includes a pair of series-connected, opposed matched diodes 62 connected at the common junction of their corresponding sides (anodes in FIG. 3) to a negative 25 volt source. By design choice of resistors 48, the shunt circuit 60 has lower impedance than the output impendance of the associated coil 28. The circuitry associated with the transistors 46 operates in the same manner as in FIG. 2 to select a head, with the exception that there are 20 distinct *Y*-select lines, instead of 10, for 20 heads served by a common read selector 17, write unit 20 and current source 24 connected to a single pair of bus lines 58. In addition, the transistors 46 automatically operate the shunt circuits 60. Thus, when a transistor 46 is in the non-conducting mode, minus 36 volts is applied to the center of the coil 28. As a result, each diode 62 in the shunt circuit 60 has approximately minus 36 volts applied to its cathode and minus 25 volts applied to the anode. Since the anode is more positive, the matched diodes 62 are forward-biased, thus forming a low impendance shunt circuit for the corresponding head 28. Then, in the absence of a corresponding *Y*-select signal the head 28 is unselected and any signal which it picks up on its associated disc track will be almost completely dissipated in the circuit provided by the shunt impedance 60. On the other hand, when a *Y*-select signal is applied to the corresponding transistor 46, +1.3 volt is applied to the coil causing the shunt diodes 62 to become reverse-biased, thus, opening the shunt circuit, as well as forward biaising the diodes 30′ connecting the coil 28 to the bus lines 58.

It should be noted that opposite currents will be flowing from the center tap of an unselected coil because of the 11 volts potential difference from the junction of diodes 62 to the end of the corresponding resistor 48. These currents are balanced, however, so that no net field is present. Also, negative 25 volts is not critical, but the diode junction must be sufficiently negative to guarantee the diodes of unselected heads be back-biased when writing or reading on another head.

Because the low impedance shunt circuit 60 associated with each of the 20 head coils 29 greatly attenuates cross talk, it becomes feasible to connect all 20 heads directly in one group to the main pair of bus lines 58, instead of separately grouping smaller numbers of heads to allow fewer heads to cross talk into a selected head. In addition to permitting a larger number of magnetic heads with common read selectors, write units and current sources, the use of the shunt circuit 60 eases the specific requirements for the diodes 30′ interconnecting each head coil with the bus lines 58. Diode matching for forward-biased voltage drop and maximum capacity requirements are significantly reduced. Moreover, the system of head selection is simplified. Instead of the $X_m$, $Y_n$ matrix selection technique required in the system of FIGS. 1 and 2, 20 separate *Y*-select lines are utilized in the illustrated embodiment of the invention.

Those skilled in the art will recognize that the details of the circuits presented in FIG. 3, such as the write unit 20, are intended to merely illustrate. The number of heads connected in parallel to the bus lines 58 may, of course, vary in practice. In addition, there is no obstacle to incorporating the shunt circuit 60 of the invention into systems like that of FIGS. 1 and 2, in which the heads are grouped with separate current sources and write units. Moreover, the particular means of applying switching voltages to the head coils 28 is a matter of design choice. It is necessary only that the diodes 30′ be carried into conduction from their normally reverse-biased condition and that the shunt diodes 62 change from their normally forward-biased condition to the reverse-biased state when the associated head is selected.

It will be understood that various changes in the details, materials, steps and arrangements of parts which have been herein described and illustrated in order to explain the nature of the invention, may be made by those skilled in the art within the principle and scope of the invention as expressed in the appended claims.

For example, transistor seitches, particularly field effect transistor switches, can be used in place of the diodes.

I claim:

1. A magnetic head circuit, comprising a head coil responsive to the magnetic condition of a magnetic storage medium, means for operatively applying different select and unselect voltages to said coil, means for operatively connecting said coil to a signal transmitting circuit in response to said select voltage, and a selective shunt circuit operatively connected across said coil having means directly responsive to said select and unselect voltages for opening and closing said said select and unselect voltages for opening and closing said shunt circuit respectively, said shunt circuit having low impedance, when closed, relative to the output impedance of said coil, said shunt circuit including a pair of diode means for controlling conduction in said shunt circuit connected in an opposed manner in series between the ends of said coil and means for applying a reference voltage to the common junction of said pair of diode means such that said diode means are forward-biased into conduction when said unselect voltage is applied to said coil and reverse-biased into nonconduction when said select voltage is applied to said coil.

2. A magnetic head circuit as recited in claim 1, wherein said coil has a center tap to which said select and unselect voltages are applied.

3. The head circuit of claim 1, wherein said means for connecting said coil to said signal transmitting circuit includes a pair of coupling diode means for controlling conduction connected to opposite ends of said coil in parallel to said shunt circuit, said coupling diode means being forward-biased into conduction when said select voltage is applied.

4. The head circuit of claim 3, wherein said signal transmitting means includes a read amplifier.

5. The head circuit of claim 3, wherein said signal transmitting means includes a write circuit, said coil being adapted to alter the magnetic condition of said storage medium.

6. A plural magnetic head system, comprising a plurality of head coils individually responsive to the magnetic condition of corresponding portions of a magnetic storage medium, a signal transmitting circuit, coupling diode means for connecting said coils respectively in parallel to said signal transmitting circuit, means for applying select and unselect voltages to said coils respectively to bias said coupling diode means for a selected head into conduction and to isolate the other coils by reverse-biasing the corresponding coupling diode means, and selective shunt circuits connected across each coil respectively, each shunt circuit having means directly responsive to the select and unselect voltages applied to the corresponding coil for operatively opening and closing said shunt circuit respectively, each said shunt circuit, when closed, having a low impedance relative to the output impedance of the corresponding coil, each said shunt circuit including a pair of diode means for controlling conduction in said shunt circuit connected in an opposed manner in series between the ends of the corresponding coil and means for applying a reference voltage to the junction of said shunt diode means such that said shunt diode means are forward-biased into conduction when said unselect voltage is applied to said coil and reverse-biased into nonconduction when said select voltage is applied to said coil.

7. The plural head system of claim 6, wherein said coupling diode means includes a pair of diode means for controlling conduction connected to opposite ends of said coil in parallel to said shunt circuit.

8. The plural head system of claim 7, wherein said signal transmitting circuit includes a read amplifier.

9. The plural head system of claim 7, wherein said signal transmitting circuit includes a write circuit, said coils being adapted to alter the magnetic condition in said corresponding portions of said storage medium.

10. The plural head system of claim 7, wherein each said coil has a center tap to which said select and unselect voltages are applied.

11. The plural head system of claim 10, wherein said means for applying voltages to said coils includes a plurality of transistor means each having two circuit leads and a base lead controlling conduction between said circuit leads, one of said circuit leads being connected both to the center tap of a corresponding head coil and a source of said unselect voltage, the other circuit lead being connected to a source of said select voltage.

* * * * *

UNITED STATES PATENT OFFICE
CERTIFICATE OF CORRECTION

Patent No. 3,824,623 Dated July 16, 1974

Inventor(s) George C. Gucker

It is certified that error appears in the above-identified patent and that said Letters Patent are hereby corrected as shown below:

Column 2, line 54, change "$X'_n$" to --$X'_m$--.

Column 5, line 43, "29" should read --28--.

Column 6, line 16, "seitches" should read --switches--.

Column 6, lines 28 and 29, delete "said select and unselect voltages for opening and closing said".

Signed and sealed this 19th day of November 1974.

(SEAL)
Attest:

McCOY M. GIBSON JR.
Attesting Officer

C. MARSHALL DANN
Commissioner of Patents